(12) United States Patent
Simonsen

(10) Patent No.: US 10,077,851 B2
(45) Date of Patent: Sep. 18, 2018

(54) HYDRAULIC CONTROL VALVE ASSEMBLY AND CONTROL SYSTEM FOR WATER SUPPLY NETWORKS

(71) Applicant: AVK Holding A/S, Galten (DK)

(72) Inventor: Christian H. Simonsen, Ulstrup (DK)

(73) Assignee: AVK Holding A/S, Galten (DK)

( * ) Notice: Subject to any disclaimer, the term of this patent is extended or adjusted under 35 U.S.C. 154(b) by 722 days.

(21) Appl. No.: 14/402,910

(22) PCT Filed: May 30, 2013

(86) PCT No.: PCT/EP2013/061162
§ 371 (c)(1),
(2) Date: Nov. 21, 2014

(87) PCT Pub. No.: WO2013/178733
PCT Pub. Date: Dec. 5, 2013

(65) Prior Publication Data
US 2015/0129054 A1    May 14, 2015

(30) Foreign Application Priority Data

Jun. 1, 2012  (EP) .................................. 12170474

(51) Int. Cl.
| | | |
|---|---|---|
| *F15B 13/042* | (2006.01) | |
| *F16K 27/02* | (2006.01) | |
| *G05D 16/16* | (2006.01) | |
| *F16K 31/385* | (2006.01) | |
| *F16K 31/36* | (2006.01) | |

(52) U.S. Cl.
CPC .......... *F16K 31/36* (2013.01); *F15B 13/0426* (2013.01); *F16K 27/02* (2013.01);
(Continued)

(58) Field of Classification Search
CPC ........ F16K 31/36; F16K 31/385; F16K 27/02; G05D 16/163; Y10T 137/7759; Y10T 137/7768; F15B 13/0426
(Continued)

(56) References Cited

U.S. PATENT DOCUMENTS 2,991,796 A  *  7/1961  Griswold .............. F16K 31/365
                                                    137/489
3,669,143 A        6/1972  Reese
(Continued)

FOREIGN PATENT DOCUMENTS

| | | |
|---|---|---|
| CN | 1906554 | 1/2007 |
| DE | 4328617 A1 | 3/1995 |
| WO | 2009/029295 A1 | 3/2009 |

OTHER PUBLICATIONS

Fisher Controls International, CN Patent Publication No. 1906554, Jan. 31, 2007; Google translation of CN1926554 and Abstract of corresponding publication US2005155651; 13 pages.
(Continued)

*Primary Examiner* — John K Fristoe, Jr.
*Assistant Examiner* — Josephine Trinidad-Borges
(74) *Attorney, Agent, or Firm* — Barclay Damon LLP

(57) ABSTRACT

A modular hydraulic control valve assembly for use in a pilot-operated hydraulic control system comprises, in one embodiment, a control valve including a valve body defining a main flow passage from an inlet on a high pressure side of the control valve to an outlet on a low pressure side of the control valve, a valve member arranged in the flow passage and separating the high pressure side from the low pressure side, a control chamber comprising means for hydraulic actuation of the valve member by applying a control pressure to the control chamber so as to position the valve member between an open position and a closed position thereby adjusting a main flow through the main flow passage
(Continued)

Figure 1:
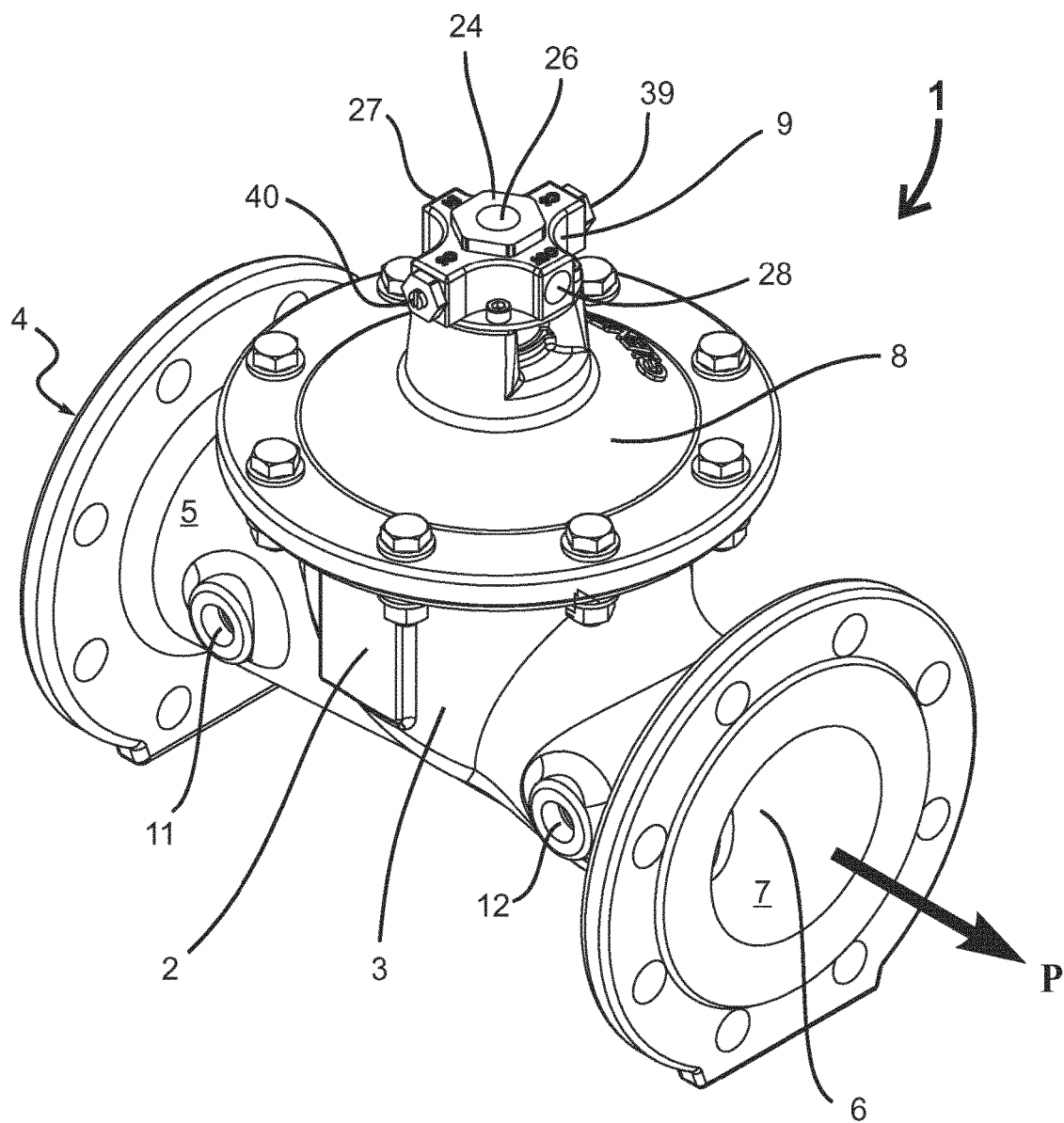

in response to the control pressure, a feed port for feeding fluid to the control chamber to increase the control pressure therein, a bleed port for bleeding fluid from the control chamber to decrease the control pressure therein, and a valve bonnet closing the control chamber. The assembly further comprises a feed check valve determining a feed flow direction, a bleed check valve determining a bleed flow direction, a distribution block including a common plenum, a control input in fluid communication with the common plenum, and a control output in fluid communication with the common plenum, wherein the distribution block further comprises a feed channel connecting the common plenum with the feed port via an adjustable feed constriction, and a bleed channel connecting the common plenum with the bleed port via an adjustable bleed constriction.

15 Claims, 12 Drawing Sheets

(52) U.S. Cl.
CPC ......... *F16K 31/385* (2013.01); *G05D 16/163* (2013.01); *Y10T 137/7759* (2015.04); *Y10T 137/7768* (2015.04)

(58) Field of Classification Search
USPC ...................................... 91/32, 33, 443, 454
See application file for complete search history.

(56) References Cited

U.S. PATENT DOCUMENTS

| | | | | |
|---|---|---|---|---|
| 4,936,541 | A * | 6/1990 | Oksanen | F16K 31/406 251/30.04 |
| 5,348,036 | A * | 9/1994 | Oksanen | G05D 7/03 137/1 |
| 5,735,308 | A * | 4/1998 | Yokota | G05D 16/0655 137/488 |
| 5,967,176 | A * | 10/1999 | Blann | F16K 31/365 137/488 |
| 6,328,275 | B1 * | 12/2001 | Yang | F16K 31/406 137/487.5 |
| 2007/0290152 | A1 * | 12/2007 | Ma | F16K 31/406 251/30.01 |
| 2010/0126601 | A1 * | 5/2010 | Heron | G05D 16/163 137/488 |
| 2011/0024132 | A1 * | 2/2011 | Pettit | E21B 34/00 166/373 |

OTHER PUBLICATIONS

EPO, Written Opinion of the International Searching Authority for International Application No. PCT/EP2013/061162, dated Nov. 7, 2013, 4 pages.
EPO, International Search Report for International Application No. PCT/EP2013/061162, dated Nov. 7, 2013, 2 pages.

* cited by examiner

OUTLET PRESSURE DECREASE

OUTLET PRESSURE DECREASE

HYDRAULIC CONTROL VALVE ASSEMBLY AND CONTROL SYSTEM FOR WATER SUPPLY NETWORKS

CROSS REFERENCE TO RELATED APPLICATIONS

This application is a national stage application pursuant to 35 U.S.C. § 371 of International Application No. PCT/EP2013/061162, filed on May 30, 2013, which claims priority to, and the benefit of, European Patent Application No. 12170474.6, filed on Jun. 1, 2012. The entire contents of such applications are hereby incorporated herein by reference.

The invention relates to the technical field of water supply networks, more particular to the field of pilot operated hydraulic control systems for use in water supply networks.

According to a particular aspect, the invention relates to a modular hydraulic control valve assembly for use in a pilot-operated hydraulic control system, the assembly comprising a control valve including a valve body defining a main flow passage from an inlet on a high pressure side of the control valve to an outlet on a low pressure side of the control valve, a valve member arranged in the main flow passage and separating the high pressure side from the low pressure side, a control chamber comprising means for hydraulic actuation of the valve member by applying a control pressure to the control chamber so as to position the valve member between an open position and a closed position thereby adjusting a flow through the main flow passage in response to the control pressure, a feed port for feeding fluid to the control chamber to increase the control pressure therein, a bleed port for bleeding fluid from the control chamber to decrease the control pressure therein, and a valve bonnet closing the control chamber, the assembly further comprising a feed check valve determining a feed flow direction, a bleed check valve determining a bleed flow direction, a distribution block including a common plenum, a control input in fluid communication with the common plenum, and a control output in fluid communication with the common plenum.

Within the scope of the present application, fluid relates to a liquid, in particular to water. In particular, the hydraulic control valve referred to in the context of the present invention is configured for use in building and operating pipe lines and/or distribution networks for water supply. Such control systems for water supply networks are particular in that they are subject to the requirement of controlling very large main flows by means of a very small control flow branched off the main flow. Furthermore, it is important that these systems are configured for self-sustaining and/or autonomous safety operation independent of any electrical power supply, electronic communication or computer control. While such hydraulic control systems for use in a water supply network in principle also may be remote controlled and/or monitored, it is an important requirement, for reasons of safety and supply network stability, that the control function can be performed locally at the control valve itself in a self-sustaining and/or autonomous manner.

A pilot operated modulating valve system is known from U.S. Pat. No. 3,669,143. The modulating valve system comprises a main valve that opens and closes for controlling a main flow in response to a pressure applied to a control chamber, wherein the response is determined by a pilot valve arranged in a control flow branched off the main flow. The control flow communicates with the control chamber via a flow stabilizer unit comprising two oppositely directed check valves for exchanging fluid between a control flow and the control chamber. The disclosed system does not allow for adjusting the opening speed and closing speed in a simple manner. Furthermore, the system is designed for a dedicated control function, and is not easily modified or upgraded without having to exchange the complete control part or even the whole valve system. Furthermore, when performing more complex control functions, cluttered constructions result in increased cost in production, due to many separate parts that have to be produced and assembled separately, as well as increased cost of ownership, due to increased servicing costs.

Therefore, there is a need for a hydraulic control system for use in water supply networks that is constructed from robust and versatile components, which may easily be configured and modified for different control functions.

According to one aspect, this object is achieved by a hydraulic control valve assembly according to claim 1, wherein advantageous embodiments are defined by the dependent claims, by the embodiments as disclosed in the following, and by any combinations thereof.

According to one embodiment of the invention, a hydraulic control valve assembly for use in a pilot-operated hydraulic control system comprises a control valve including a valve body defining a main flow passage from an inlet on a high pressure side of the control valve to an outlet on a low pressure side of the control valve, a valve member arranged in the main flow passage and separating the high pressure side from the low pressure side, a control chamber comprising means for hydraulic actuation of the valve member by applying a control pressure to the control chamber so as to position the valve member between an open position and a closed position thereby adjusting flow through the main flow passage in response to the control pressure, a feed port for feeding fluid to the control chamber to increase the control pressure therein, a bleed port for bleeding fluid from the control chamber to decrease the control pressure therein, and a valve bonnet closing the control chamber. The assembly further comprises a feed check valve determining a feed flow direction, a bleed check valve determining a bleed flow direction, a distribution block including a common plenum, a control input in fluid communication with the common plenum, and a control output in fluid communication with the common plenum, wherein the distribution block further comprises a feed channel connecting the common plenum with the feed port via an adjustable feed constriction, and a bleed channel connecting the common plenum with the bleed port via an adjustable bleed constriction.

The hydraulic control valve has a main flow passage from an inlet to an outlet that may be gradually opened and closed in order to control the pressure drop across and thus the flow through the control valve. The pressure drop across and thus the flow through the control valve is determined by the valve member position, wherein a given valve member position is hydraulically actuated by applying a given pressure to the control chamber. When using the assembly in a pilot operated hydraulic control system, a small control flow is branched off the main flow and guided parallel thereto from the high pressure side via the common plenum in the distribution block and back to the low pressure side. To that end, a fluid connection is established between the high pressure side of the control valve and the control input of the distribution block so as to guide fluid from the high pressure side through the control input to the common plenum. Furthermore, a fluid connection is established between the control output of the distribution block and the low pressure side of the control valve so as to guide fluid from the common plenum through the control output to the low pressure side. The common plenum communicates with the control chamber via the feed and the bleed channels connected to the respective feed and bleed ports. Thereby, the pressure in the control chamber may be controlled by controlling the pressure in the common plenum. The pressure in the common plenum is determined by the pressure drop distribution along the control flow path, which in turn is determined by the particular local conditions to which the flow is subjected. In pilot operation, the pressure drop distribution along the control flow path is controlled by means of a pilot valve inserted in the control flow. Typically, the pilot valve is arranged downstream of the distribution block, but may also be placed upstream thereof for certain control functions.

Constrictions in the fluid connection between the common plenum and the control chamber determine, for a given pressure difference between the common plenum and the control chamber, the flow rate to and from the control chamber, and thus the speed at which pressure differences between the common plenum and the control chamber are reduced/balanced. The constrictions thus determine the speed at which the pressure in the control chamber is increased and/or decreased. Consequently, constrictions in the feed and/or bleed between the common plenum and the control chamber determine the opening and/or closing speed of the main flow passage of the control valve in response to any pressure changes observed in the common plenum. By providing an adjustable constriction in the feed channel between the common plenum and the control chamber, and a separate adjustable constriction in the bleed channel between the common plenum and the control chamber, the opening speed and closing speed can be adjusted independently. The assembly can thus easily be configured and reconfigured independently by merely adjusting the feed and/or bleed constrictions integrated in the distribution block. Thereby, a particularly versatile, yet compact hydraulic control valve assembly is achieved that can be easily configured and reconfigured for use in a large variety of control functions.

Further, according to one embodiment of a hydraulic control valve assembly according to the invention, the control input of the distribution block comprises an input orifice. The input orifice provides a flow resistance introducing a pressure drop when the high pressure side of the valve is connected to the control input. The input orifice thus controls the rate of fluid exchange between the high pressure side of the hydraulic control valve and the input side of the distribution block. By integrating an input orifice in the control input, the pressure build-up in the common plenum is controlled directly in the distribution block. This allows pre-configuring the distribution block, and thus the hydraulic control valve assembly for use in a pilot-operated hydraulic control system where the pilot valve is arranged downstream of the distribution block.

Further, according to one embodiment of a hydraulic control valve assembly according to the invention, the adjustable feed constriction and/or the adjustable bleed constriction are needle valves.

As mentioned above, the adjustable constrictions allow for adjusting the response speed of opening and/or closing of the control valve with respect to pressure changes in the control flow branch, and in particular pressure changes in the common plenum. The needle valves allow for a precise setting/calibration of these opening and/or closing speeds. Preferably, the needle valves are arranged accessible from the outside of the distribution block, and may further preferably be protected against tampering and/or any inadvertent changes in the setting.

Further, according to one embodiment of a hydraulic control valve assembly according to the invention, the distribution block has a single piece housing at least partially defining the common plenum, wherein the housing has a top wall, a bottom wall opposite to the top wall as seen in an axial direction, and a circumferential wall connecting the top wall and the bottom wall. To facilitate easy production, configuration and/or servicing, the distribution block has a single piece housing at least partially defining the common plenum, and which is provided with bores defining the required fluid conduits for the control input, the control output, the feed and bleed channels, as well as bores for receiving the respective adjustable feed and bleed constrictions integrated in the feed and bleed channels. In a preferred embodiment, the bores for receiving the adjustable constrictions are threaded bores intercepting the feed/bleed channels for receiving a needle valve member provided with a cooperating outer thread, and defining in combination with the feed/bleed channels a valve seat at the point of interception. Preferably, the adjustable constrictions are operable from the outside of the hydraulic control valve assembly so as to allow for an easy adjustment/calibration when the hydraulic control assembly is in use.

Advantageously according to one embodiment of a hydraulic control valve assembly, the control input and the control output are provided in the circumferential wall of the housing and are connected to the common plenum by bores passing through the circumferential wall. In this configuration, the control input and output face away from the axial direction towards any conduits that may be provided for connecting the high pressure side with the control input and the control output with the low pressure side. Furthermore, this geometry provides easy access of multiple external conduits to the common plenum and enhances modularity with respect to any auxiliary devices to be added to the hydraulic control valve assembly when configuring a hydraulic control system for performing a given control function.

Further, according to a preferred embodiment of a hydraulic control valve assembly according to the invention, the bottom wall of the distribution block housing includes a flange portion for connecting the distribution block to a cooperating flange portion on the control valve, the cooperating flange portion comprising the feed port and/or the bleed port. Thereby a compact and rugged design is achieved. Furthermore, a versatile assembly is obtained, that is particularly well suited for use in a modular hydraulic control system avoiding auxiliary device and conduit clutter.

Further, according to a further preferred embodiment of a hydraulic control valve assembly according to the invention, the cooperating flange portion of the control valve is arranged on the valve bonnet. By adding the distribution block directly as a component to the valve bonnet, integration and operative/functional coupling of the distribution block to the control chamber and to the valve trim is facilitated, thereby enhancing the response of the hydraulic control assembly to pressure changes applied to the common plenum.

As mentioned above, attaching the distribution block directly to the control valve, simplifies the arrangement of auxiliary devices and conduits for configuring a particular hydraulic control system. This is not a mere aesthetic choice, but has a number of technical advantages, amongst others reducing installation cost and enhancing reliability of any such system. One example illustrating the advantages of a simplified arrangement may be found in the context of installing a pilot operated control function in a water supply network using a hydraulic control system built around a hydraulic control valve assembly according to advantageous embodiments of the invention, and subsequently starting up the water supply network with the added control functionality. When the hydraulic control assembly is mounted in an 'upright' position, i.e. in a position where the control chamber is arranged above the main flow passage as seen with respect to gravity, the distribution block is preferably attached directly on top of the control valve, advantageously on top of the valve bonnet. The distribution block directly accesses the control chamber of the control valve via feed/bleed lines, wherein the common plenum is arranged at a top level with the control input/output extending radially outward with respect to the vertical, and at level with the common plenum. Auxiliary devices, such as a filter on the control input side and a pilot control valve on the control output side of the distribution block, may thus easily be mounted also at level with the common plenum, and may be connected to respective taps on the high pressure side and on the low pressure side by conduits extending directly downward from the top level to the main flow passage. Thereby undesirable pockets are avoided and the risk of trapping air in the control branch of the hydraulic control system is reduced. Any air introduced in the system, e.g. during a system shutdown, component installation or replacement may easily be removed by passing fluid through the control branch from the high pressure side to the low pressure side. This largely obviates the need for tedious and time consuming venting operations after any such installation and/or shutdown and prevents malfunction of the control valve under operation.

Further, according to one embodiment of a hydraulic control valve assembly according to the invention, the feed channel extends from the common plenum via the adjustable feed constriction to a feed opening provided in the distribution block flange, the feed opening being aligned for operative connection with the feed port when the distribution block is connected to the control valve, and/or the bleed channel extends from the common plenum via the adjustable bleed constriction to a bleed opening provided in the distribution block flange, the bleed opening being aligned for operative connection with the bleed port when the distribution block is connected to the control valve. By guiding at least one of the feed or bleed channels to an opening in the flange on the bottom wall of the distribution block, which opening is aligned with the corresponding feed or bleed port in the cooperating flange of the control valve, assembling, servicing and configuring the hydraulic control valve assembly is made considerably easier. Preferably, both the feed channel and the bleed channel are guided to respective openings in the flange on the bottom wall of the distribution block, which openings are aligned with the corresponding feed port and bleed port in the cooperating flange of the control valve. Furthermore by these embodiments, the hydraulic control valve assembly design is further simplified adding to the ruggedness, as well as further facilitating use of the hydraulic control assembly as a core modular building block in a modular hydraulic control system. Further preferably, the cooperating flange of the control valve is arranged on the valve bonnet.

Advantageously according to one embodiment, the flow through the feed channel and/or the bleed channel are controlled by threaded needle valve members arranged in bores extending from the circumferential outer wall to the feed/bleed channel, respectively. Preferably, these needle valve bores are oriented transverse of the axial direction.

Further, according to one embodiment of a hydraulic control valve assembly according to the invention, the distribution block housing has a central bore parallel to the axial direction, wherein the central bore is closed by an insert, and wherein the insert defines the common plenum in combination with the housing. Besides facilitating easy production of the distribution block, this design is particularly advantageous if the insert is detachably connected to the distribution block housing, e.g. by a threaded engagement. Such a replaceable insert allows for easy re-configuration of the distribution block, e.g. for adding measuring/monitoring functionality to the hydraulic control valve assembly.

Advantageously, the insert has an aperture penetrating the distribution block so as to provide access to the control chamber and/or the valve actuation mechanism through the distribution block when the distribution block is mounted on the control valve. Further advantageously, the common plenum is formed in combination by the housing and the insert as a toroidal cavity around said aperture of the insert. The aperture, which may be arranged concentrically with respect to the toroidal cavity and which may be e.g. drilled along the axial direction, provides direct access to the control chamber and/or a valve member actuation mechanism, such as a valve stem. Advantageously, the aperture may be aligned with the valve stem. Additional apertures may be provided in the insert. The one or more apertures provided in the insert of the distribution block may be used for mechanical indicators visualising the valve member position, ventilation, sensor access and/or feed-through, access to the valve mechanism for any emergency overwrite of the control function, or the like.

Further, according to one embodiment of a hydraulic control valve assembly according to the invention, the feed check valve and/or the bleed check valve are biased check valves. By providing a bias to the check valve, a minimum pressure difference has to occur between the control chamber and the common plenum before fluid is transferred, thus delaying the opening/closing response of the control valve with respect to pressure changes. Thereby it is avoided, that the valve member reacts instantaneously on any infinitesimal change in pressure in the common plenum. Providing a bias to the feed check valve imposes a minimum excess pressure in the common plenum for feeding fluid to the control chamber. Providing a bias to the bleed check valve imposes a minimum excess pressure in the control chamber for bleeding fluid to the common plenum. Providing a bias to both the feed check valve and the bleed check valve thus implements a hysteresis in the opening/closing response of the control valve with respect to the pressure established in the control flow branch, and more particularly the pressure in the common plenum.

Further, according to one embodiment of a hydraulic control valve assembly according to the invention, the feed controls closing of the control valve and the bleed controls opening of the control valve. In this embodiment, fluid injected from the common plenum through the feed line into the control chamber increases pressure in the control chamber and controls deployment of the control valve member for closing of the main flow passage of the valve, whereas fluid released from the control chamber through the bleed line to the common plenum decreases pressure in the control chamber and controls retraction of the valve member for opening of the main flow passage of the control valve.

Further, according to one embodiment of a hydraulic control valve assembly according to the invention, the feed port of the control chamber and/or the bleed port of the control chamber are integrated in the valve bonnet.

Further, according to one embodiment of a hydraulic control valve assembly according to the invention, the feed check valve is integrated in the feed port of the control chamber and/or the bleed check valve is integrated in the bleed port of the control chamber, or alternatively the feed check valve is integrated in the distribution block in the portion of the feed channel between the adjustable feed constriction and the feed port and/or the bleed check valve is integrated in the distribution block in the portion of the bleed channel between the adjustable bleed constriction and the bleed port. Either of these embodiments gives an advantageously compact configuration.

According to a further aspect of the invention, a pilot operated hydraulic control system comprises a hydraulic control valve assembly according to any of the above-mentioned embodiments, the hydraulic control system further comprising an input conduit connecting the high pressure side of the control valve with the control input, an output conduit connecting the control output with the low pressure side of the control valve, and a control pilot arranged in the output conduit or in the input conduit. The pilot valve opens or closes in response to a pilot parameter, wherein a pilot signal is compared with a pre-determined pilot set-point. Operating the pilot valve affects the pressure drop distribution over the control flow branch comprising the input conduit, the distribution block, and the output conduit, and thus controls the pressure applied to the control chamber according to the pilot parameter. As a consequence, opening and closing of the main flow passage through the control valve is controlled in response to the pilot parameter. The pilot signal may be fed as hydraulic pressure signal(s) directly to the pilot valve. The pilot set-point may be determined mechanically, such as by adjusting a spring loaded mechanical bias to the pilot valve member. The comparison may be performed as a pressure balance across a diaphragm controlling the pilot valve member position and may include a spring load mechanical bias applied to the diaphragm. Alternatively or in addition thereto, pilot signals may also be measured using suitable transducers/sensors and may be provided as electrical/optical signals to a motorized valve actuator driving the pilot valve. Further advantageously, the control pilot may be controlled and/or monitored remotely from a central water supply network management facility.

Typically, the input conduit further comprises a filter for retaining contaminants entering the input conduit together with the control flow branched off from the high pressure side. Thereby, such contaminants are prevented from choking/clogging/congesting the delicate components with narrow constrictions in the control flow branch of the system.

As mentioned above, in an advantageous embodiment, the distribution block of the hydraulic control valve assembly is arranged directly on top of the control valve, preferably on top of the valve bonnet, wherein the common plenum is placed at a top level from which the control input and control output extend sideways/radially outward essentially at level with the common plenum. A hydraulic control system built around such a hydraulic control valve assembly as a basic building block allows for easily keeping any conduits and auxiliary devices, such as a filter on the control input side and a pilot valve, at level with or below the common plenum so as to avoid any air trapping pockets in the control branch of the hydraulic control system. Amongst others, such a configuration e.g. reduces installation start-up cost and adds to the reliability and stable operation of the hydraulic control system in a water supply network.

Advantageously according to one embodiment, the hydraulic control system is configured to perform a hydraulic control function selected from the group of pressure reduction, pressure sustaining, rate of flow, and level control.

Further, according to one embodiment of a hydraulic control system according to the invention, the control pilot is configured from a kit of modular components, comprising as a basic component present in all devices configured from the kit a standardized device body with six openings arranged pairwise on opposite sides of the body along three axes, wherein at least the openings along two of the axes are matched to each other, to the control input of the distribution block, and to the control output of the distribution block in a standardized manner.

Further, according to one embodiment of a hydraulic control system according to the invention, the three axes are oriented orthogonal to each other. By imposing an orthogonal symmetry, the modularity is enhanced.

An advantageous kit of modular components for configuring an auxiliary device for use in a hydraulic control system comprises as a basic component that is present in all devices configured from that kit, a device body with six openings arranged pairwise on opposite sides of the device body along three axes, the axes preferably being oriented orthogonal to each other. The openings of the device body along a primary axis are configured for receiving a functional trim component defining the function type of the device. The functional trim components comprised in the kit are preferably standardized to fit at least one of the openings on the primary axis. The function type comprises as a minimum a 'single-function type', and may further advantageously comprise 'multiple-function types' and/or 'filtering'. A pilot valve functional trim comprises one or more valve seats, valve members and valve stems. Depending on the pilot valve function to be performed, one or more regulating modules are attached. Each regulating module is configured to actuate the valve trim in response to a pilot parameter, wherein the regulating module receives a pilot signal of the respective pilot parameter and outputs an actuation according to a pre-determined set point, control curve, or any other predetermined control scheme/algorithm for the respective pilot parameter. The one or more pilot signals fed to the regulating module may be hydraulic, e.g. in the case of a diaphragm or piston type regulating actuator, or electrical, e.g. in the case of a solenoid regulating actuator. In a preferred embodiment, the regulating modules have a standardised interface flange for connecting to the valve trim and device body, the standardised interface flange being independent of the particular pilot valve function type.

The term 'single-function pilot valve' refers to a pilot valve that controls a given pilot valve flow passage in response to a single pilot parameter. According to one embodiment, a single-function pilot valve comprises a housing and a valve trim having a single valve seat cooperating with a valve-member to control a pilot valve flow passage. The pilot valve further comprises a regulating module actuating a valve stem comprised in the valve trim and attached to the valve member. Preferably, the housing is the above-mentioned standardised device body, wherein the valve trim fits in one of the openings along the primary axis and the opposite opening on the primary axis is closed by a plug. The pilot flow passage is defined from a first opening to a second opening on the secondary axes. The valve trim may further be configured to simultaneously connect any of the further openings provided on the secondary axes so as to branch off hydraulic signals from the pilot flow passage, which may be fed back to the regulating module as a pilot signal.

The term 'multiple-function pilot valve' refers to a pilot valve that controls a given pilot valve flow passage in response to multiple pilot parameters. Different kinds of multiple-function pilot valve trims may be conceived.

According to one embodiment, a multiple-function pilot valve comprises a body, and in the body, a valve trim having a single valve seat cooperating with a valve-member to control a pilot valve flow passage. The pilot valve further comprises a first regulating module actuating a first valve stem comprised in the valve trim and attached to the valve member. The pilot valve further comprises a second regulating module actuating a second stem arranged in the valve trim in axial alignment with the first valve stem. The second stem is configured such that it may act on the valve member to control the pilot flow passage from the opposite side of the first stem. The first and second regulating modules may be configured to implement different functions, such as pressure reducing and pressure sustaining, within the same pilot valve and using the same valve member/valve seat set. Advantageously, the single seat multiple-function pilot valve may be provided using the above-mentioned standardised device body. Furthermore, the additional function may also be provided by retro-fitting an existing single-function pilot valve in a standardised device body. In this case, the plug closing the second opening of the primary axis is removed, and the second valve stem is inserted and secured by means of an intermediate stem guide/stuffing piece. On a distal side facing outward from the device body, the intermediate piece is provided with a standardised interface flange to which a regulating module with a corresponding standardised interface is attached.

According to another embodiment, a multiple-function pilot valve comprises a housing, preferably the above-mentioned standardised device body allowing for easy retrofit change of the functionality, and a valve trim having a first valve seat cooperating with a first valve-member attached to a first valve stem to control a pilot valve flow passage. The valve trim further comprises a second valve seat cooperating with a second valve-member attached to a second valve stem to control the same pilot valve flow passage in combination with the first valve member/valve seat set. The first and second valve stems are axially aligned and the corresponding first and second valve members are arranged concentrically with respect to each other. The pilot valve further comprises a first regulating module actuating the first valve stem according to a first regulating scheme to implement a first function, and a second regulating module actuating the second valve stem according to a second regulating scheme to implement a second function. The first and second regulating modules may again be configured to implement different functions, such as pressure reducing and pressure sustaining, within the same pilot valve, and preferably using a single standardised device body. The flow through the pilot flow passage may thus be controlled independently by two functions in respect of independent pilot parameters. Thereby a control pilot with a particularly compact configuration, yet allowing for performing complex multifunction control functions, is achieved. Even though the first and second valve stems are not in contact with each other in order to act on the same valve member/valve seat set and are operated for regulating according to independent functions, the axial alignment of the stems furthermore allows for providing an elastic coupling, e.g. by means of a spring, between the first and second stems, thus adding a further handle to configuring complex multifunction pilot control tasks in a compact configuration. The openings along secondary axes act as fluid input/output, which is controlled by the functional trim of the primary axis. The openings along the two secondary axes are preferably configured with standardized connectors which may be used for input/output of fluid flow, as input/output of hydraulic pressure signals, and/or as sensing/measuring ports for monitoring the fluid passed through the device. Openings not used for a given device configuration are plugged with a removable plug. The device may thus at any time easily be reconfigured and/or upgraded to enhance functionality by removing the plug and adding/replacing functional trim elements. Thereby, easy assembly, adaption, configuration and re-configuration of the hydraulic control system is achieved, wherein the modularity is supported by the modularity of the distribution block, wherein the input/output openings along the secondary axes are matched to the control input and control output of the distribution block in a standardized manner. The modular design of the hydraulic control system with the hydraulic control valve assembly as the core module, in combination with the modular design of the auxiliary devices using a common modular body for all auxiliary devices with multiple access ports allows for an easy retrofit upgrade of the hydraulic control system without having to replace the entire control branch, or even the complete hydraulic control system. Furthermore, the modularity of the distribution block/hydraulic control valve assembly in combination with the modularity of the control pilot avoids cluttered Christmas-tree configurations of the control branch that are common in water supply network control, in particular when configured for a highly complex control scheme involving multiple control functions.

In the following, the invention is further explained referring to exemplifying embodiments. The drawings show schematically on FIG. 1. a perspective view of a hydraulic control valve assembly according to one embodiment, FIG. 2. a cross-sectional side view of the hydraulic control valve assembly of FIG. 1, FIG. 3 a cross-sectional detail taken at the feed line and the bleed line of the hydraulic control valve assembly of FIG. 1, FIG. 4 a top view of the distribution block included in the hydraulic control valve assembly of FIG. 1, FIG. 5 diagrammatically, an embodiment of a pilot-operated hydraulic control system comprising a hydraulic control valve assembly, FIG. 6 a single seat function pilot valve according to one embodiment comprising a modular valve block and one out of different alternative regulating modules, FIG. 7 the modular valve block of FIG. 6 in an open position, FIG. 8 an example of using a single-function pilot valve, FIG. 9 another example of using a single-function pilot valve, FIG. 10 a further example of using a single-function pilot valve, FIG. 11 a modular valve block for a single seat multiple-function pilot valve according to one embodiment, FIG. 12 a single seat multiple-function pilot valve comprising the valve block of FIG. 11, FIG. 13 an example of using a single seat multiple-function pilot valve, FIG. 14 another example of using a single seat multiple-function pilot valve, FIG. 15 a further example of using a single seat multiple-function pilot valve, FIG. 16 a modular valve block for a dual seat multiple-function pilot valve according to one embodiment with one valve member in a) an open position and b) in closed position, FIG. 17 an example of using a dual seat multiple-function pilot valve, FIG. 18 another example of using a dual seat multiple-function pilot valve, FIG. 19 a further example of using a single seat multiple-function pilot valve, and FIG. 20 a modular filter according to one embodiment.

FIG. 1 shows a perspective view of a hydraulic control valve assembly 1 for use in a hydraulic control system for performing a control function in a water supply network in response to changes in water pressure fluctuations. The hydraulic control valve assembly 1 comprises a control valve 2 including a valve body 3 defining a main flow passage from an inlet 4 on a high pressure side 5 of the control valve 2 to an outlet 6 on a low pressure side 7 of the control valve 2 in a lower part of the control valve 3. The general direction of the main flow M is indicated by an arrow P and coincides with a longitudinal direction of the hydraulic control valve assembly 1. The valve body further comprises a first tap 11 for branching off a control flow C from the main flow M at the high pressure side 5 of the control valve 2, and a second tap 12 for returning the control flow C to the main flow at the low pressure side 7 of the control valve 2. In a vertical direction, the valve body 3 is closed by a valve bonnet 8 holding the valve trim of the control valve 2 and covering a control chamber 10 (refer FIG. 2). On top of the valve bonnet 8, the hydraulic control valve assembly comprises a distribution block 9 through which fluid may be introduced from the control flow C into the control chamber 10 as well as returned from the control chamber 10 to the control flow C.

Figure 2:
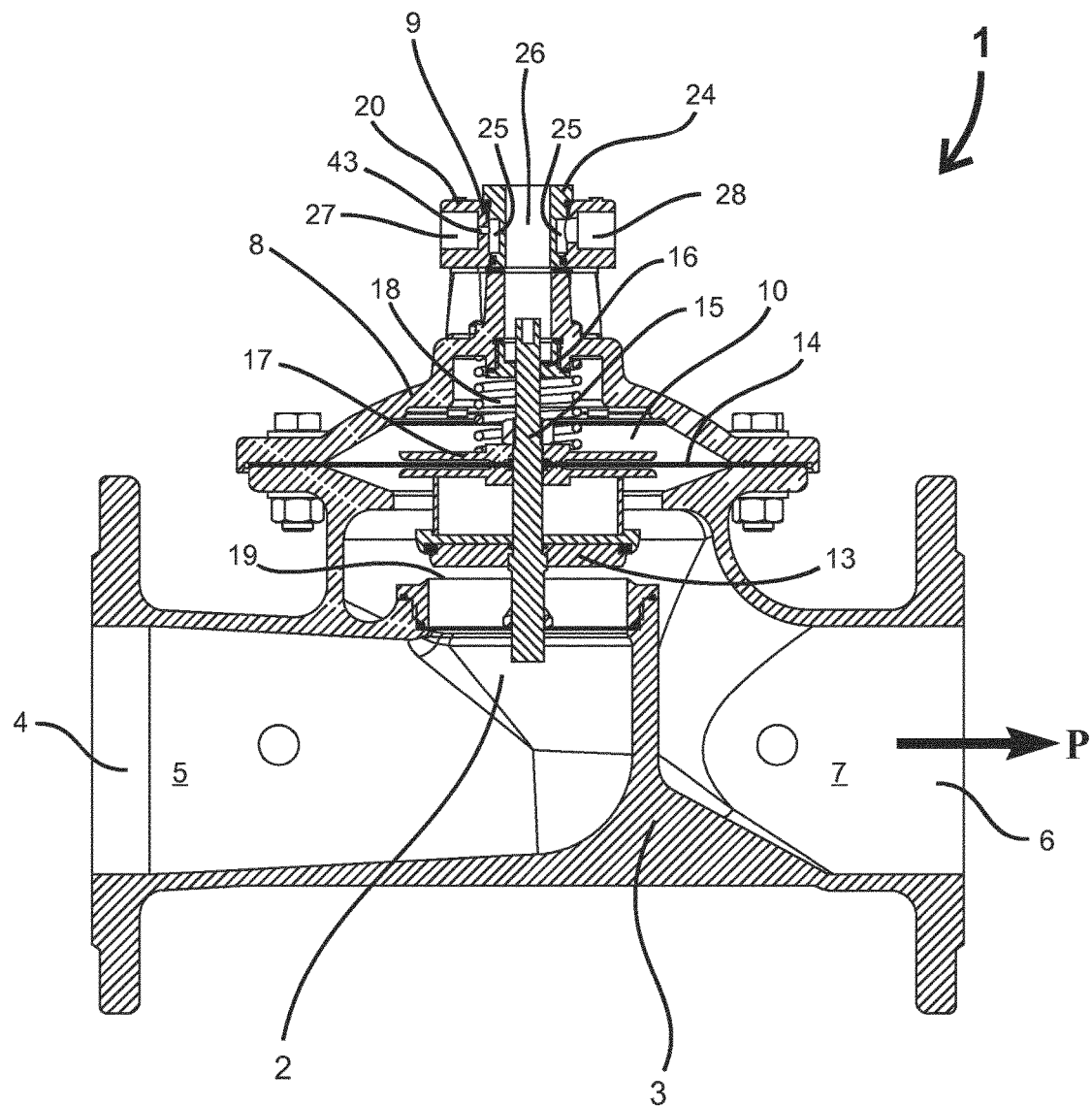

FIG. 2 shows a cross-sectional side-view of the hydraulic control valve assembly 1 of FIG. 1 as seen in a vertical cut plane along a longitudinal direction of the hydraulic control valve assembly 1. The control valve 2 comprises valve body 3 forming the main flow passage from the inlet 4 on the high pressure side 5 to the outlet 6 at the low pressure side 7. A valve member 13 intercepts the main flow passage and separates the high pressure side 5 from the low pressure side 7. The valve member 13 is operated to be positioned between an open position and a closed position by means of a hydraulic valve trim in the control chamber 10. The control chamber 10 is defined in an upper portion of the control valve 2, adjacent to the main flow passage. An upper wall of the control chamber 10 is defined by the valve bonnet 8, which comprises access ports through which the control chamber 10 may be accessed from the outside. A lower wall of the control chamber 10 is defined by a diaphragm 14, which separates the control chamber 10 from the main flow passage. The diaphragm 14 flexes depending on the pressure difference across the diaphragm 14, i.e. any difference between a control pressure applied in the control chamber 10 and the pressure in the main flow passage present at the location of the valve member 13. The diaphragm 14 is linked by clamping means 17 to a valve stem and piston arrangement 15 for actuating/positioning the valve member 13, here in the form of the valve disk of a globe type valve. The valve stem is guided by guiding means. At an upper end of the valve stem 15, the guiding means comprise a sealed stem guide 16 through which the valve stem 15 is passed to the exterior of the control chamber 10. The hydraulic actuation may be combined with a mechanical bias 18 applied to the valve actuation mechanism. By increasing the pressure in the control chamber 10, the diaphragm 14 flexes downward, thereby moving the valve disk 13 towards a valve seat 19 and thus closing the flow passage. By reducing the pressure in the control chamber 10, the diaphragm 14 flexes upward against the mechanical bias of the spring 18, thereby moving the valve disk 13 towards a valve seat 19 and thus opening the flow passage. The main flow M through the main flow passage may thus be controlled in response to a control pressure applied to the control chamber 10.

The control pressure is applied to the control chamber 10 through distribution block 9. The distribution block 9 has a housing 20 with a top wall 21, a bottom wall 22, and a circumferential wall 23. The housing 20 has a central bore penetrating the housing 20 along an axial direction from the top wall 21 to the bottom wall 22. The central bore is configured for receiving a threaded insert 24 in sealing engagement, wherein the insert 24 and the housing 20 in combination define a common plenum 25 in the form of a toroidal chamber around the axial direction. The insert 24 further comprises a central aperture 26 penetrating the distribution block 9. The central aperture 26 is in coaxial alignment with the valve stem 15 when the distribution block 9 is mounted on the valve bonnet 8 and provides direct access to the exterior portion of the valve stem 15. The housing 20 comprises a control input 27 through which fluid enters the common plenum 25, and a control output 28 through which fluid is discharged from the common plenum 25. The control input 27 and the control output 28 are arranged on the circumferential wall 23 facing radially away from the axial direction and are aligned with respect to each other on a common input/output axis in a radial direction perpendicular to the axial direction.

The distribution block 9 is mounted directly on the valve bonnet 8 of the control valve 2, thereby forming a modified valve bonnet 8, 9 adapted for use of the control valve 2 in a modular hydraulic control system. The distribution block 9 is connected to the valve bonnet 8 via a flange 29 provided on the bottom wall 23 cooperating with a flange 30 provided on the top of the valve bonnet 8 to form a sealing engagement including a flat seal placed between flange 29 of the distribution block 9 and the cooperating flange 30 of the control valve 2.

Figure 3:
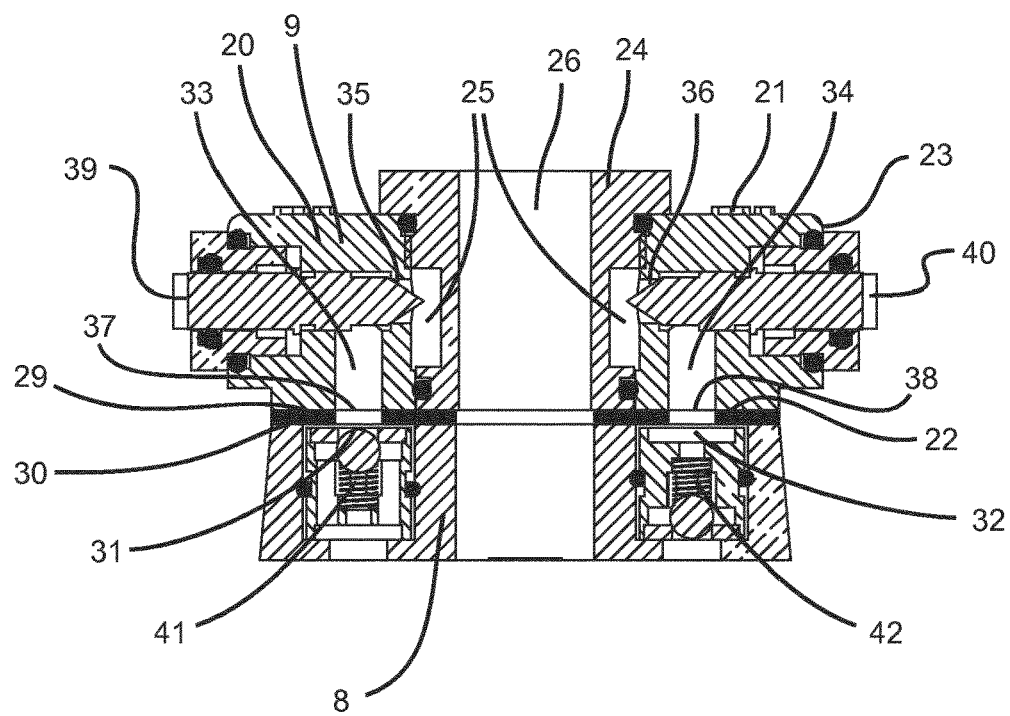

FIG. 3 shows a detail of the hydraulic control valve assembly 1 of FIG. 1 in a cross-section taken at the top of the hydraulic control valve assembly 1 in a vertical cut-plane perpendicular to the longitudinal direction P. The housing 20 of the distribution block 9 forms in combination with the insert 24 the common plenum 25 in the form of a toroidal chamber. The control valve 2 comprises a feed port 31 for feeding fluid to the control chamber 10 to increase the control pressure therein, and a bleed port 32 for bleeding fluid from the control chamber 10 to decrease the control pressure therein. A feed channel 33 connects the common plenum 25 with the feed port 31 via an adjustable feed constriction 35, and a bleed channel 34 connects the common plenum 25 with the bleed port 32 via an adjustable bleed constriction 36. The feed channel 33 ends in a feed channel opening 37 and the bleed channel 34 ends in a bleed channel opening 38, both being provided on the distribution block flange 29. The feed port 31 and the bleed port 32 are arranged in the valve bonnet flange 30 and are respectively aligned with the feed channel opening 37 and the bleed channel opening 38 provided in the distribution block flange 29. Advantageously, the feed and bleed channels 33, 34 comprise first portions formed as bores extending from the openings 37, 38 in the flange to a second portion of the channels formed as radial bores from the circumferential surface 23 to the common plenum 25, wherein the radial bores forming the second portions are aligned on a common feed/bleed adjustment axis oriented in a radial direction perpendicular to the axial direction and perpendicular to the radial input/output axis. The radial bores of the feed/bleed channels 33, 34 are closed by needle valve inserts 39, 40. The needle valve inserts 39, 40 each comprise a bushing threaded from the exterior into the circumferential wall 23 of the housing 20 and a needle member cooperating with a seat formed in the respective channel 33, 34 to provide an adjustable constriction. The hydraulic control valve assembly 1 further comprises a feed check valve 41 for determining a feed flow direction, and a bleed check valve 42 for determining a bleed flow direction. The feed and bleed check valves 41, 42 are biased so as to require a minimum pressure difference to be applied across the check valves 41, 42, before opening in the respective flow direction. In the embodiment shown in FIG. 3, the feed check valve 41 is in integrated the feed port 31, and the bleed check valve 42 is integrated in the bleed port 32. However, the feed/bleed check valves 41, 42 may also be integrated in the respective feed/bleed channels 33, 34 in the distribution block 9.

In operation, fluid enters the hydraulic control valve assembly 1 through control input 27 and reaches common plenum 25. If the pressure in the common plenum 25 exceeds the pressure in the control chamber 10 plus an excess pressure to overcome the bias of the feed check valve 41, the fluid may pass through the feed line (feed channel 33; feed constriction 35; feed check valve 41; feed port 31) from the common plenum 25 to the control chamber 10, thereby increasing the pressure in the control chamber 10 and closing the control valve 2. If the pressure in the control chamber 10 exceeds the pressure in the common plenum 25 plus an excess pressure to overcome the bias of the bleed check valve 42, the fluid may pass through the bleed line (bleed channel 34; bleed constriction 36; bleed check valve 42; bleed port 32) from the control chamber 10 to the common plenum 25, thereby decreasing the pressure in the control chamber 10 and opening the control valve 2. From the common plenum 25, the fluid leaves the hydraulic control valve assembly 1 through control output 28. Preferably, the control input 27 includes an input orifice 43.

Figure 4:
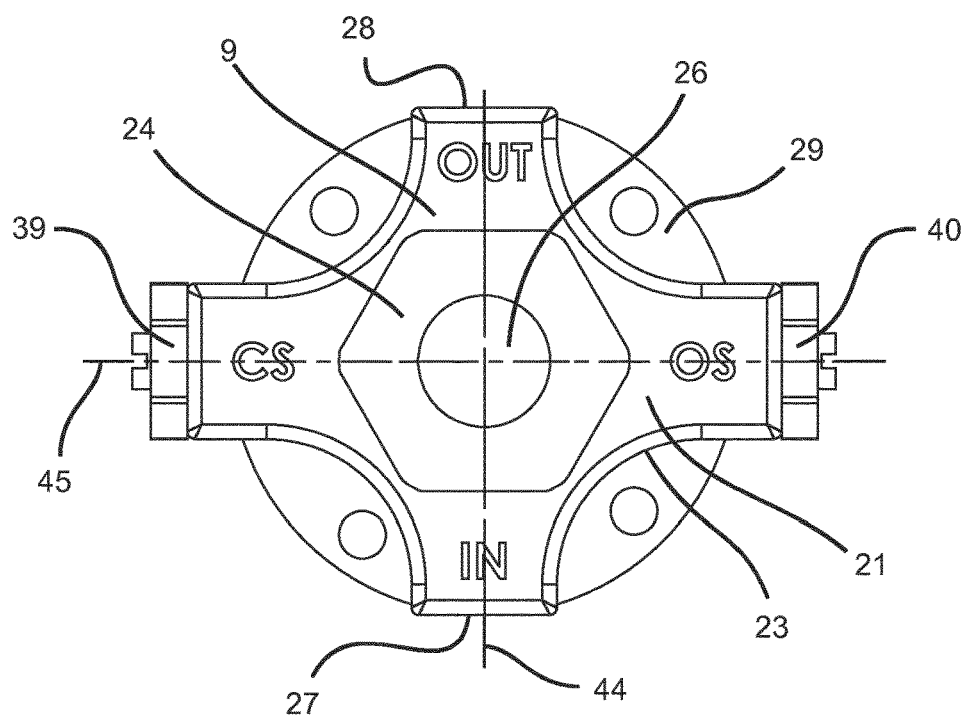
Figure 5:
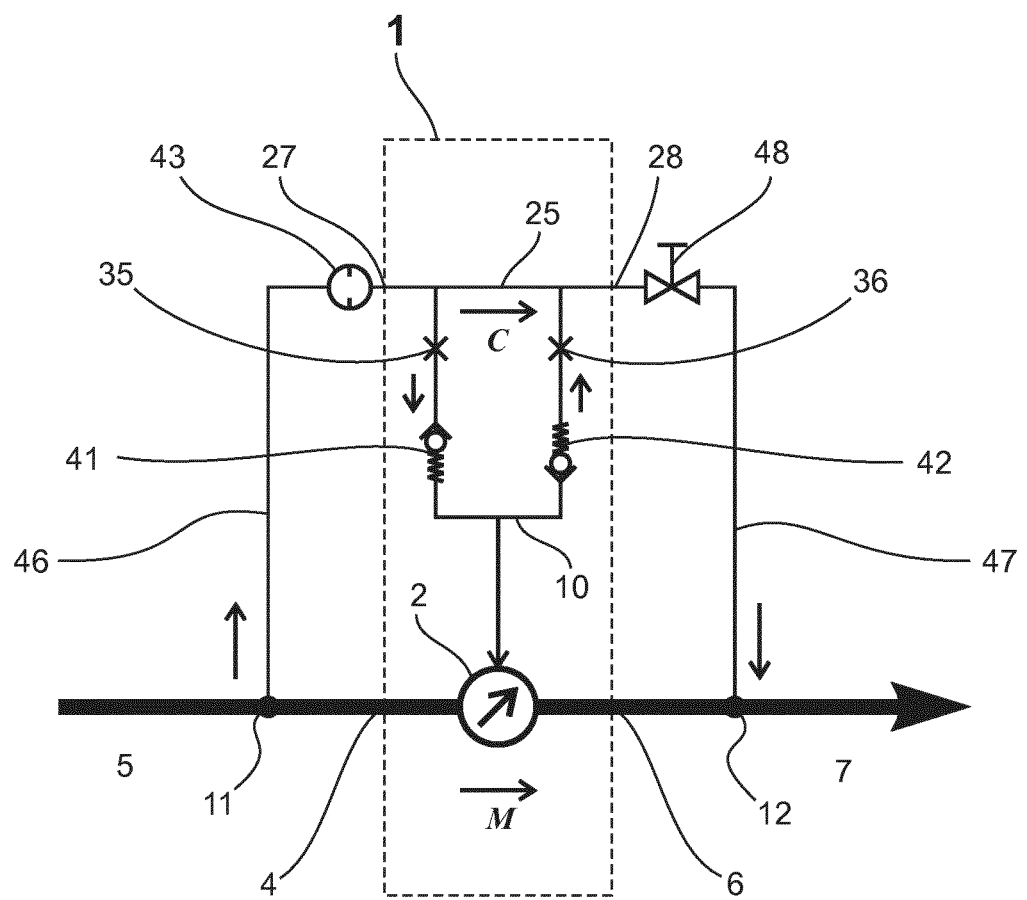

FIG. 4 shows a top elevational view of an advantageous embodiment of the distribution block 9 as used in the illustrative embodiment of the hydraulic control valve assembly 1 described above. The distribution block 9 comprises the housing 20 which in combination with the insert 24 defines a toroidal common plenum (25, refer FIG. 2 and FIG. 3) in fluid communication with the control input 27, control output 28, the feed channel 33, and the bleed channel 34. The control input 27 and the control output 28 are aligned on an input/output axis 44, and adjustment portions of the feed channel 33 and of the bleed channel 34 are aligned on a feed/bleed adjustment axis 45, wherein the input/output axis 44 and the feed/bleed adjustment axis 45 are perpendicular to each other and perpendicular to the axial direction, which is advantageously aligned with the valve stem axis when the distribution block 9 is mounted on the control valve 2. Thereby, the modularity of the distribution block 9 and thus of the hydraulic control valve assembly 1 is enhanced.

FIG. 5 shows a pilot operated hydraulic control system comprising a hydraulic control valve assembly 1 according to any of the above-mentioned embodiments, wherein arrows indicate directions of flow. The hydraulic control valve assembly 1 comprises the control valve 2, which opens and closes in response to a control pressure applied to the control chamber 10 by controlling a pressure in the common plenum 25. The control chamber 10 communicates with the common plenum 25 via adjustable feed constriction 35 and feed check valve 41 for feeding fluid to the control chamber 10 to increase the pressure therein. Furthermore, the control chamber 10 also communicates with the common plenum 25 via bleed check valve 42 and adjustable bleed constriction 36 for bleeding fluid from the control chamber 10 to decrease the pressure therein. The hydraulic control system comprises an input conduit 46 connecting a tap 11 on the high pressure side 5 of the control valve 2 with the control input 27, an output conduit 47 connecting the control output 28 with a tap 12 on the low pressure side 7 of the control valve 2, and a control pilot 48 arranged in the output conduit 47, i.e. downstream of the control output 28. An input orifice 43 may advantageously be provided in the control input 27, but may also be arranged upstream thereof. The taps 11, 12 may advantageously be provided on the body of the control valve 2, but may also be arranged outside of the assembly 1. At the tap 11 at the high pressure side 5, a small control flow C is branched off the main flow M, passed through the common plenum 25 of the assembly 1, further through the control pilot 48, and finally returned to the main flow at the tap 12 on the low pressure side 7. The pressure in the common plenum 25 is determined by the pressure drop distribution along the control flow path, and may be controlled by adjusting the control pilot 48 according to a pilot parameter. The control valve 2 may thus be operated to control the main flow M entering the hydraulic control valve assembly 1 at inlet 4, passing through the control valve 2, and leaving the assembly 1 at outlet 6. The main flow M is controlled in response to the pressure of the control flow C in the common plenum 25, which is determined by the control pilot 48. Building the control system thus merely involves adding a control pilot 48 with the desired control function to the basic modular building block defined by the hydraulic control valve assembly 1, connecting the control input 27 with the high pressure tap 11, and the control output with the low pressure tap 12.

Figure 6:
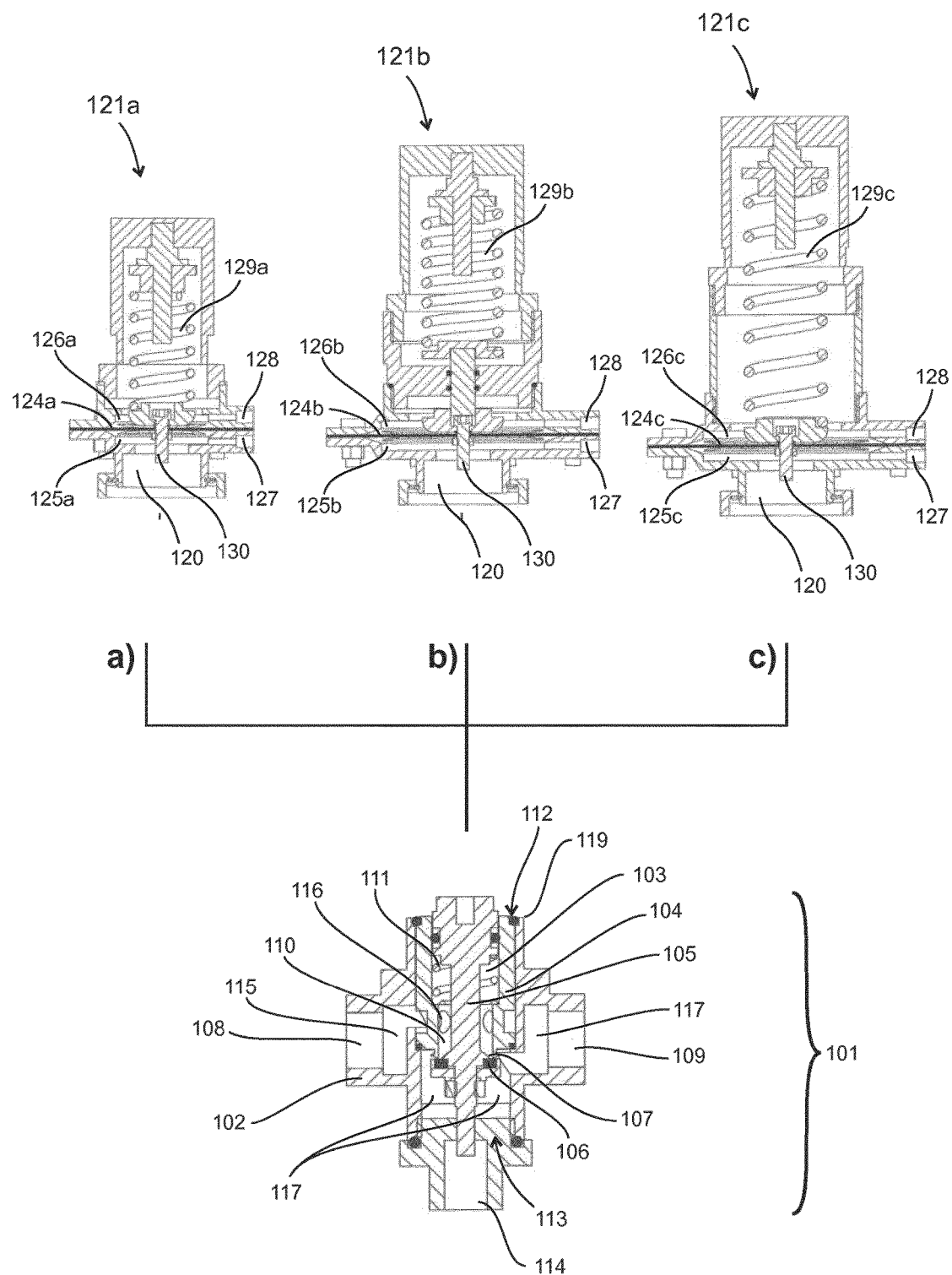

FIG. 6 shows a single seat function pilot valve 100 according to one embodiment. The pilot valve 100 comprises a modular valve block 101 having a modular device body 102 fitted with a single seat valve trim 103. The single seat valve trim 103 comprises a stem guiding element 104 guiding a valve stem 105 to move in an axial direction along the primary axis of the device body 102. The valve stem 105 carries a valve member 106, which cooperates with a valve seat 107 to form an adjustable valve passage 118 (see FIG. 7) controlling a pilot valve flow passage from an inlet opening 108 to an outlet opening 109 on a secondary axis of the device body 102. In an upper portion of the valve trim 103, the stem guiding element 104, the valve stem 105 and the valve member 106 define an inner chamber 110 of the valve trim 103. Furthermore, the valve trim 103 comprises a spring 111 biasing the valve member 106 towards the closed position shown in FIG. 6.

The valve trim 103 is inserted through a first opening 112 of a primary axis of the device body 102. A second opening 113 of the primary axis is closed by a plug 114, here shown with a sealed feed-through for the valve stem 105. Under operation, fluid enters the device body 102 through the inlet opening 108, and passes through an inlet chamber 115, via openings 116 in the wall of stem guiding element 104, to the inner chamber 110. A high pressure side of the pilot valve flow passage is thus defined by the inlet opening 108, the inlet chamber 115 and the inner chamber 110. The fluid passes through the valve opening 118 to an outlet chamber 117 defined by the device body 102, a lower portion of the valve trim 103, and the plug 114. The fluid eventually leaves the device body 102 through the outlet opening 109. A low pressure side of the pilot valve flow passage is thus defined by the outlet chamber 117 and the outlet opening 109, wherein the adjustable valve opening 118 separates the high pressure side from the low pressure side.

At the first opening 112, the device body 102 forms together with the valve trim insert 103 a standardized interface 119 for receiving a regulating module 121a, 121b, 121c with a compliant standardised interface flange 120. The compliant standardised interface flange 120 allows for interchangeably connecting regulating modules 121a, 121b, 121c, such as the spring loaded diaphragm actuators shown in FIG. 6, independent of the functional trim of the valve block 101. The spring loaded diaphragm actuators comprise a stud 130, driven by a diaphragm 124a, 124b, 124c which flexes in dependence of the pressure difference between a proximal chamber 125a, 125b, 125c, and a distal chamber 126a, 126b, 126c, in addition to an adjustable mechanical bias 129a, 129b, 129c. The terms 'proximal' and 'distal' are defined as seen from the standardised interface flange 120. The pressure in the proximal chamber 125a, 125b, 125c may be set by a hydraulic pressure signal fed through a proximal chamber input 127. The pressure in the distal chamber 126a, 126b, 126c may be set by a hydraulic pressure signal fed through a distal chamber input 128. The regulating modules 121a, 121b, 121c may vary e.g. in spring constant, diaphragm size and stem displacement to match different regulation applications. While distinguishing different components of the different regulating modules 121a, 121b, 121c in FIG. 6 by index a/b/c in order to emphasize which components may differ and which components have to follow the same standard to achieve the desired modularity, the distinction is not relevant for the further understanding of the invention. Corresponding components are therefore in the following only referred to in general by their respective number. It is further noted, that any type of valve actuators responsive to an input signal, including piston type actuators or solenoid actuators, may be attached to the standardised interface 119 of the modular valve block 101 to form a pilot valve 100, as long as these actuators are provided with a compliant standardised interface flange 120. Single control functions may thus comprise pressure reducing, pressure sustaining, flow rate control, altitude level control, electric control, motorized control, and the like.

Figure 7:
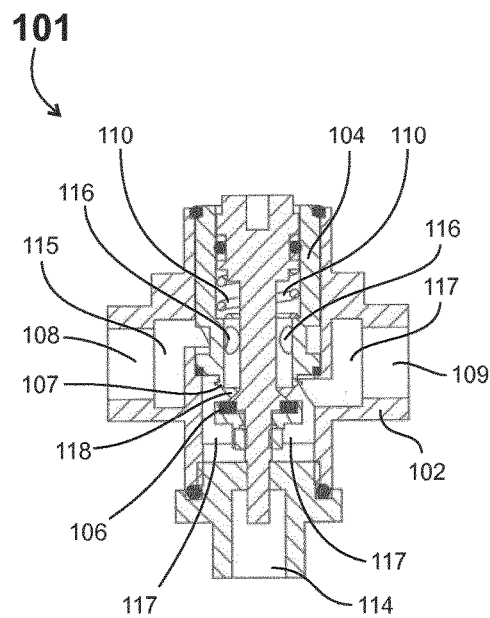

FIG. 7 shows the modular valve block 101 of the pilot valve 100 of FIG. 6. The valve member 106 is shown in an open position at a distance from the valve seat 107, thereby connecting the high pressure side 108, 115, 110 with the low pressure side 117, 109 of the pilot valve flow passage through the adjustable valve passage 118.

Figure 8:
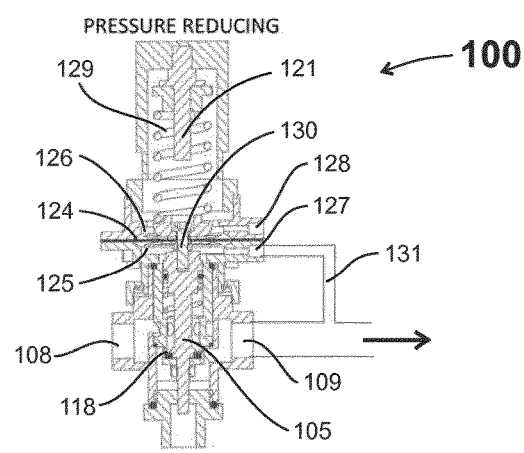
Figure 9:
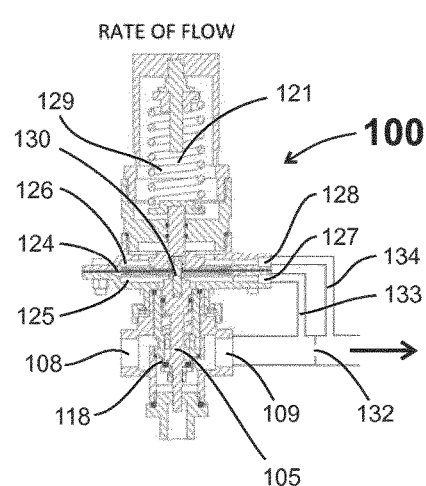
Figure 10:
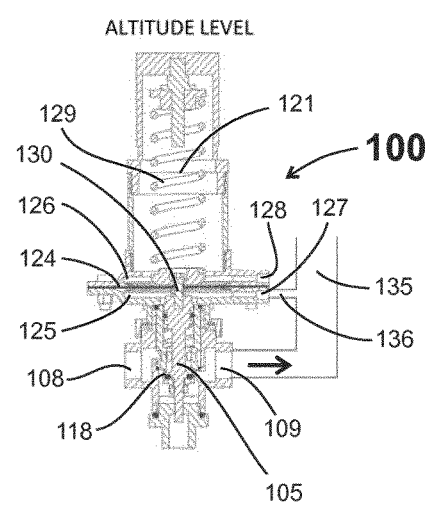

FIG. 8, FIG. 9, and FIG. 10 show three examples of using a single-function pilot valve 100 as those shown in FIG. 6 and FIG. 7. The pilot valve 100 is mounted to control a control flow (arrow) in a control branch, wherein the control flow enters the pilot valve 100 through opening 108, is controlled by the variable valve passage 118, and leaves the pilot valve through opening 109. The single-function pilot valve 100 has a diaphragm actuator 121, which is responsive to hydraulic pressure signals fed to a proximal chamber 125 through the proximal chamber input 127 and/or to a distal chamber 126 through the distal chamber input 128. As discussed above, the diaphragm 124 flexes depending on the pressure difference between the proximal chamber 125 and the distal chamber 126, and drives in combination with the mechanical bias 129 the valve stem 105 via the stud 130. An excess pressure in the proximal chamber 125 acts to close the flow passage 118 against the bias of the spring 129. An excess pressure in the distal chamber 126 acts to open the valve passage 118 supported by the bias of the spring 129. By adjusting the mechanical bias 129, a desired set point for the respective pilot parameter may be selected.

In the pressure reducing setup of FIG. 8, a hydraulic pressure signal 131 is fed back from the control flow portion downstream of the pilot valve 100 to the proximal chamber 125, whereas the distal chamber 126 receives no signal. Thereby, the pilot valve 100 controls the control flow in response to the downstream pressure.

In the flow rate controlling setup of FIG. 9, a known, preferably calibrated, constriction 132 is placed downstream of the pilot valve 100. A first hydraulic pressure signal 133 sampled immediately upstream of the constriction 132 is fed back to the proximal chamber 125, and a second hydraulic pressure signal 134 sampled immediately downstream of the constriction 132 is fed back to the distal chamber 126. The diaphragm 124 thus senses the pressure drop across the constriction 132, which is representative of the flow rate through the constriction 132. Thereby, the pilot valve 100 controls the control flow in response to the flow rate.

In the altitude level controlling setup of FIG. 10, the pilot valve 100 is mounted in the supply line of a vessel 135. A hydraulic pressure signal 136 representative of the fluid level in the vessel 135 is sampled below a pre-determined minimum level and fed back to the proximal chamber 125, whereas the distal chamber 126 receives no signal. Analogue to the pressure reducing setup of FIG. 8, the pilot valve 100 controls the control flow in response to the downstream pressure 136, which in turn represents the level in the vessel 135. If the level in vessel 135 exceeds a given pre-selected level, the excess pressure in the proximal chamber 125 acts to close the valve passage 118 against the bias of the spring 129, thereby cutting the supply for filling the vessel 135. On the other hand, if the level falls below a given pre-selected level, the bias of the spring 129 gradually opens the supply line to re-fill the vessel 135.

Figure 11:
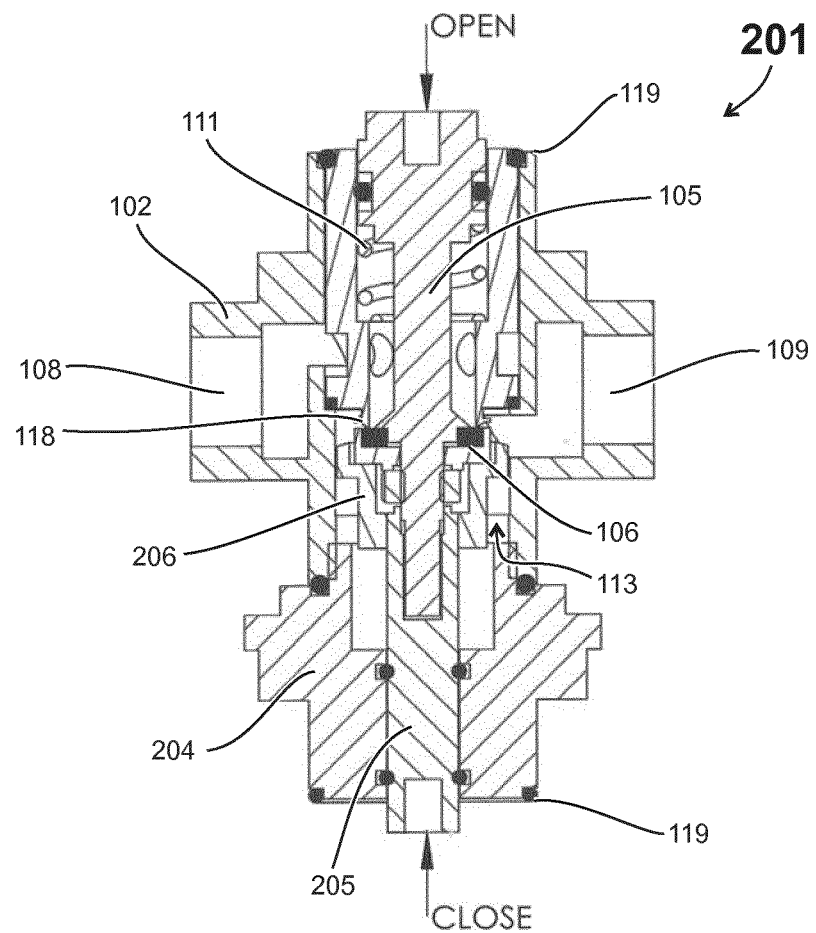
Figure 12:
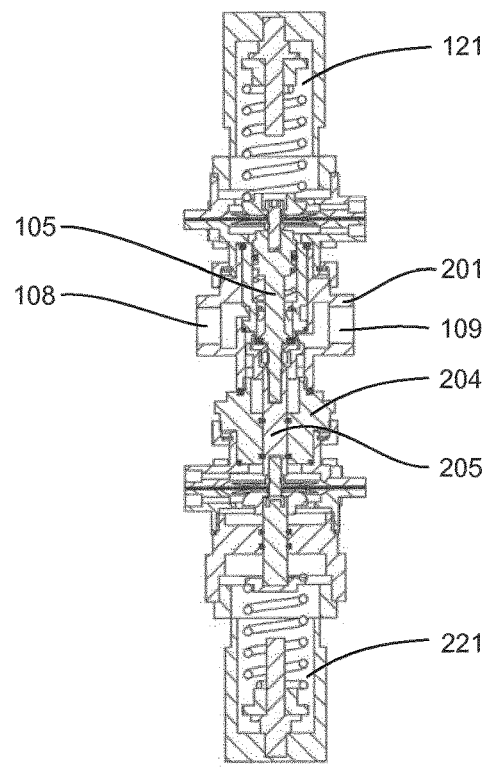

FIG. 11 shows a modular valve block 201 for a single seat multiple-function pilot valve 200 according to one embodiment. The valve block 201 is built using the same device body 102 and single seat valve trim 103 as the single seat single-function valve block 101 discussed above. Therefore only the differences between the single-function embodiment 101 and the multiple-function embodiment 201 of the single seat valve blocks are explained. The single seat multiple-function valve block 201 differs from the single seat single-function valve block 101 by the additional valve stem 205, which is provided in axial alignment with the valve stem 105 and from the opposite side of the device body 102. An upper portion 206 of the additional valve stem 205 is configured to contact and directly act on the valve member 106. The additional valve stem 205 is guided and sealed by an intermediate stem guide/stuffing piece 204. Pushing the valve stem 105 into the device body 102 opens the valve passage 118 against the bias of the spring 111, whereas pushing the additional valve stem 205 into the device body 102 may bring the upper portion 206 thereof in direct contact with the valve member and/or the valve stem 105, to act in an opposite direction, i.e. closing the valve passage 118 supported by the bias of the spring 111. The intermediate piece 204 replaces the plug 114 and is therefore at a proximal end configured to fit into the second opening 113 on the primary axis of the device body 102. On a distal end, the intermediate piece 204 is configured to provide a standardised interface 119 for attaching regulating modules with a compliant standardised interface flange 120. FIG. 12 shows a single seat multiple-function pilot valve 200 comprising the valve block 201 of FIG. 11. Attached to the valve block 201 are two spring loaded diaphragm actuators like those discussed above, used as regulating modules 121, 221. A first regulating module 121 acts on the first valve stem 105, and a second regulating module 221 acts on the second valve stem 205. Note, that the regulating modules 121, 221 may differ from each other and may be of any suitable kind for driving the valve stems 105, 205 in response to a respective pilot parameter.

Figure 13:
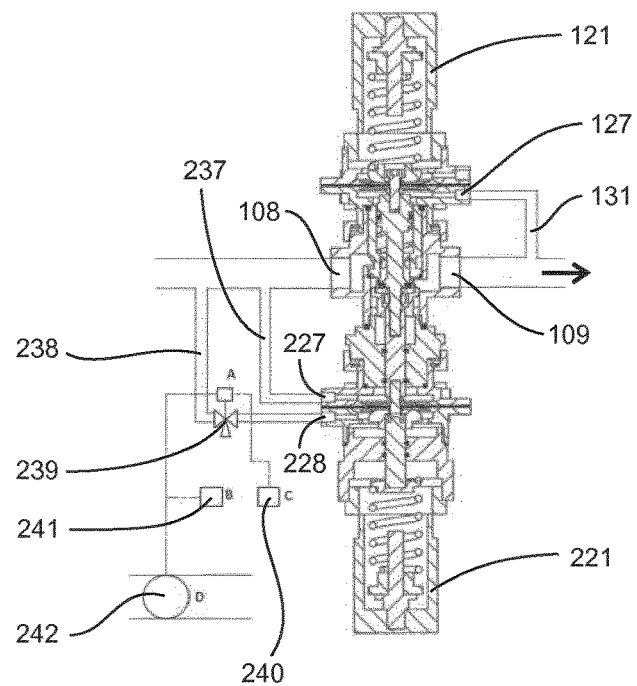
Figure 14:
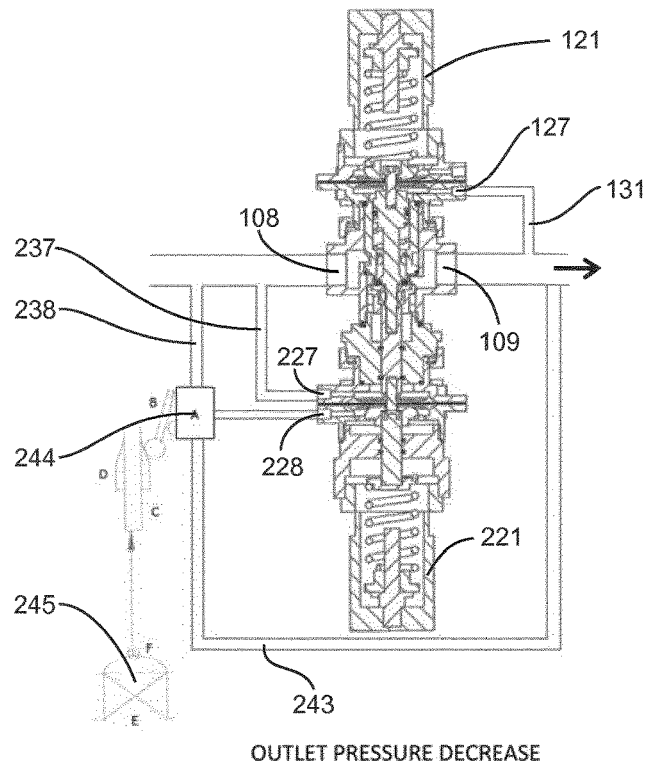
Figure 15:
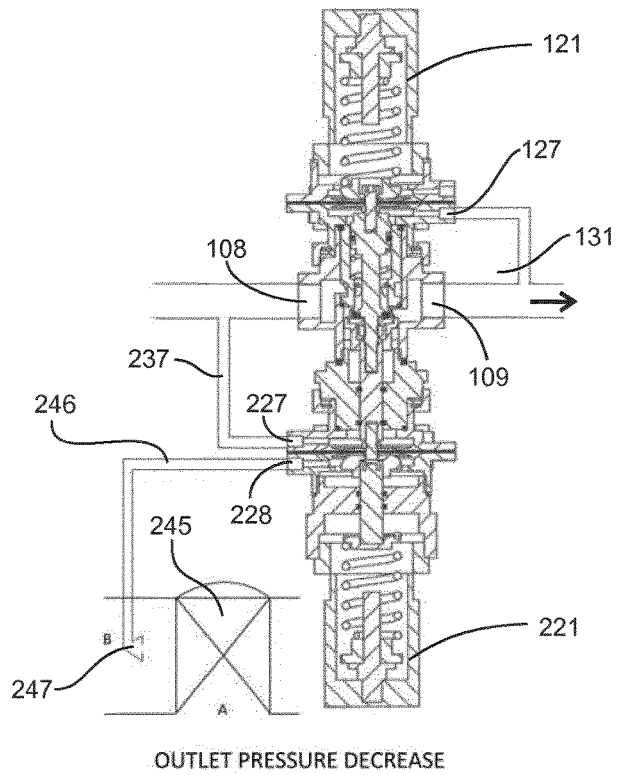

Examples of using a single seat multiple-function pilot valve 200 for pressure management are given in FIG. 13, FIG. 14, and FIG. 15. In all three examples, the first regulating module 121 is connected to perform a pressure reducing function controlling the pressure in a downstream portion of the control flow as discussed above. To that purpose, a hydraulic pressure signal 131 is fed back from the downstream portion of the control flow to the proximal chamber input 127 on the first regulating module 121. An increase of the mechanical bias of the spring in the first regulating module 121 results in an increase of the pressure at the outlet 109. In the dual stage pressure management setup of FIG. 13, a hydraulic pressure signal 237 of the pressure in an upstream portion of the control flow is fed to the proximal chamber input 227 of the second regulating module 221, and the same pressure is fed as hydraulic pressure signal 238 to the distal chamber input 228 of the second regulating module 221. The hydraulic pressure signal 238 may be switched according to electrical signals by means of a solenoid valve 239. Shutting the solenoid valve 239 reliefs the pressure provided to the distal chamber input 228, and results in an increase in the outlet pressure observed downstream of the pilot valve 200, e.g. at the outlet opening 109. The electrical signals controlling the solenoid valve 239 may e.g. be provided by a timer 240 and/or a controller 241 connected to a flow transmitter 242. In the dual stage pressure management setup of FIG. 14, the hydraulic pressure signal 237 of the upstream pressure is fed to the proximal chamber input 227 of the second regulating module 221, and the same pressure is fed as hydraulic pressure signal 238 to the distal chamber input 228 of the second regulating module 221. Alternatively instead of the upstream pressure, the downstream pressure may be fed as a hydraulic pressure signal 243 to the distal chamber input 228. The distal chamber input 228 may be switched between the higher pressure upstream signal 238 and the lower pressure downstream signal 243 by means of a three-way hydraulic relay 244, which is actuated via a mechanical link by the valve member position of the pilot operated main control valve 245 such that an opening of the main control valve 245 introduces the lower pressure signal 243 to distal chamber input 228, the pilot valve passage opens, and the pressure at the outlet opening 109 increases. In the dynamic proportional pressure management setup of FIG. 15, the hydraulic pressure signal 237 feeds the upstream pressure to the proximal chamber input 227 of the second regulating module 221. A hydraulic signal 246 samples a dynamic pressure differential depending on the flow velocity in the main flow and feeds that pressure to the distal chamber input 228. An increase in flow velocity results in a decrease in the pressure fed to the distal chamber input 228, and thus to an increase in the pressure at the outlet opening 109. Such a flow velocity dependent pressure may for instance be sampled by a so-called 'Annubar' or similar probes 247.

Figure 16:
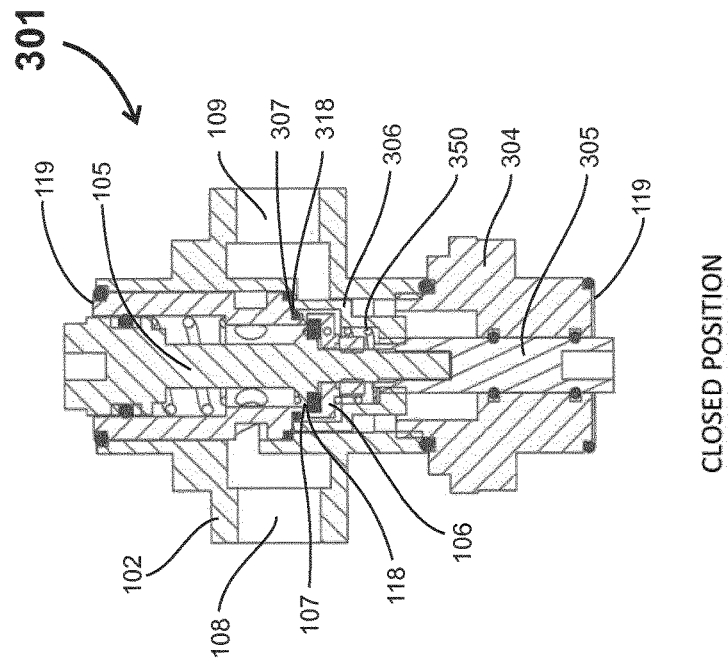
Figure 16:
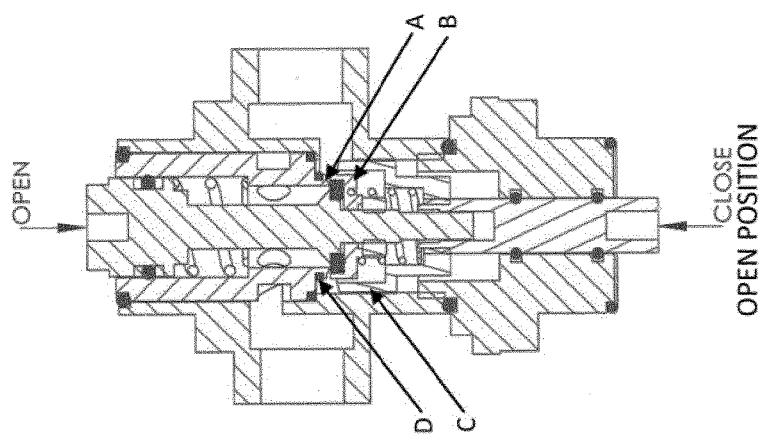

FIG. 16 shows a modular valve block 301 for a dual seat multiple-function pilot valve 300. The valve block 301 comprises a device body 102, fitted with a functional trim having a first valve stem 105 and a second valve stem 305 that are axially aligned on the primary axis of the device body 102. The valve stems 105, 305 can be actuated from opposite directions by means of regulating modules. The regulating modules may be attached to drive the valve stems 105, 305 via standardised interfaces 119/120 on the modular valve block 301. The valve stem is guided in a sealed feed-through by an intermediate stem guide/stuffing piece 304, which preferably is identical to the above-mentioned intermediate stem guide/stuffing piece 204 of the valve block 201.

Figure 17:
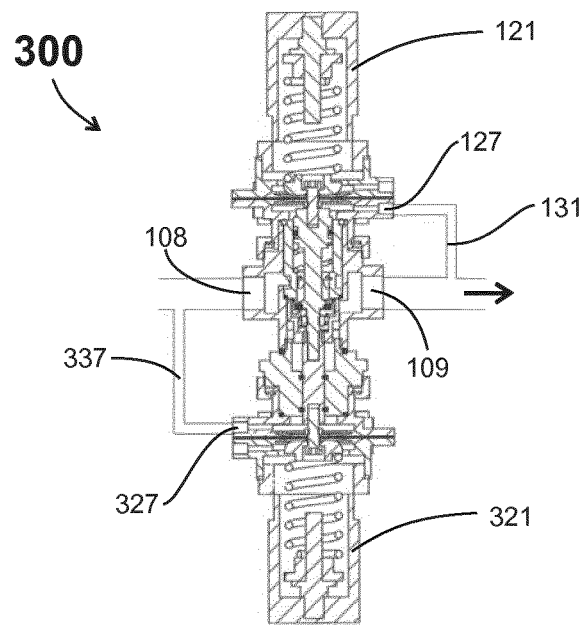
Figure 18:
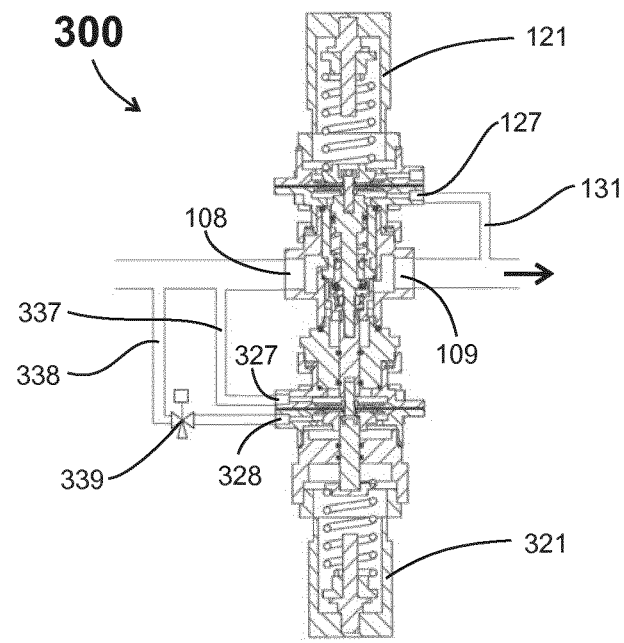
Figure 19:
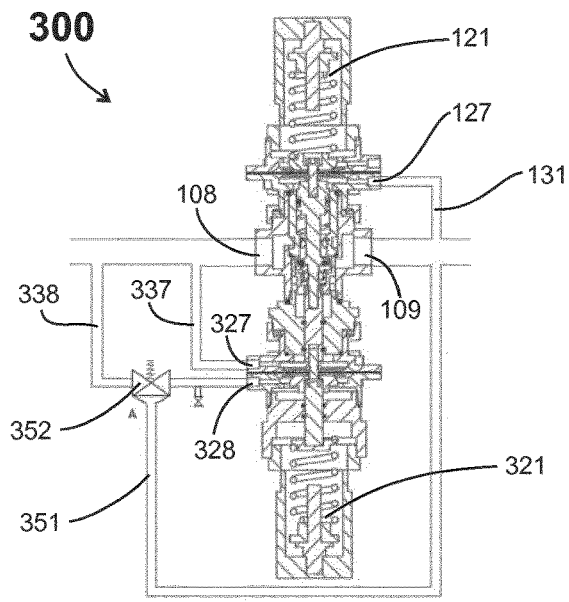

A first valve member 106 is attached to the first valve stem 105 and cooperates with a corresponding valve seat 107 to form a first adjustable valve passage 118. The valve block 301 differs from the above-mentioned single seat multiple-function pilot valve block 201 in that an upper portion of the second valve stem 305 forms a second valve member 306 cooperating with a corresponding second valve seat 307 to form a second adjustable valve passage 318 around the first valve passage 118. The two valve passages 118, 318 may be actuated independent of each other, but act in series on the same flow from the inlet opening 108 to the outlet opening 109 of the device body 102. The two independent valve members may be soft-coupled via a spring 350 arranged between the first valve stem/member 105/106 and the second valve stem/member 305/306 and to provide a bias keeping the second valve passage 318 normally open. Examples of using of a dual seat multiple-function pilot valve for implementing different combined regulation tasks in a compact manner are shown in FIG. 17, FIG. 18, and FIG. 19. In the of FIG. 17, a first regulating module 121 drives the first valve stem/member 105/106 in response to the downstream pressure fed back as a hydraulic signal 131 to the proximal chamber input 127. The first regulating module 121 thus provides a pressure reducing control function. A second regulating module 321 drives the second valve stem/member 305/306 in response to the upstream pressure fed as a hydraulic signal 337 to the proximal chamber input 327. The second regulating module 321 thus provides a pressure sustaining control function. FIG. 18 shows the pressure reducing/pressure sustaining setup of FIG. 17 with the addition of an electric shut-off function, wherein the upstream pressure is also fed to the distal chamber input 328 as a hydraulic pressure signal 338. The signal 338 may be switched e.g. by means of a three-way solenoid valve 339 configured to relief the pressure at the distal chamber input 328, when the solenoid is energized. Other possible combinations comprise, but are not limited to combinations of the following functions: pressure reducing, electric shut-off; flow rate, pressure sustaining, and altitude level. FIG. 19 shows a dual seat multiple-function pilot valve 300 used for implementing a combination of pressure reducing, pressure sustaining, and hydraulic shut off. The first regulating module 121 is configured and connected for pressure reducing control as discussed above. Furthermore, the second regulating module 321 receives a hydraulic pressure signal 337 from the upstream side at the proximal chamber input 327, thus operating as a pressure sustaining regulator. Furthermore, the upstream pressure is fed as signal 338 to the distal chamber input 328. The signal may be interrupted by a so-called relief pilot 352 in response to the downstream pressure signal 351. If the diaphragm of the first regulating module is damaged, the pilot valve opens and the outlet pressure increases. In this situation, the relief pilot 352, which is normally closed, opens, and the second valve member 306 closes, thereby protecting the downstream pipeline.

Figure 20:
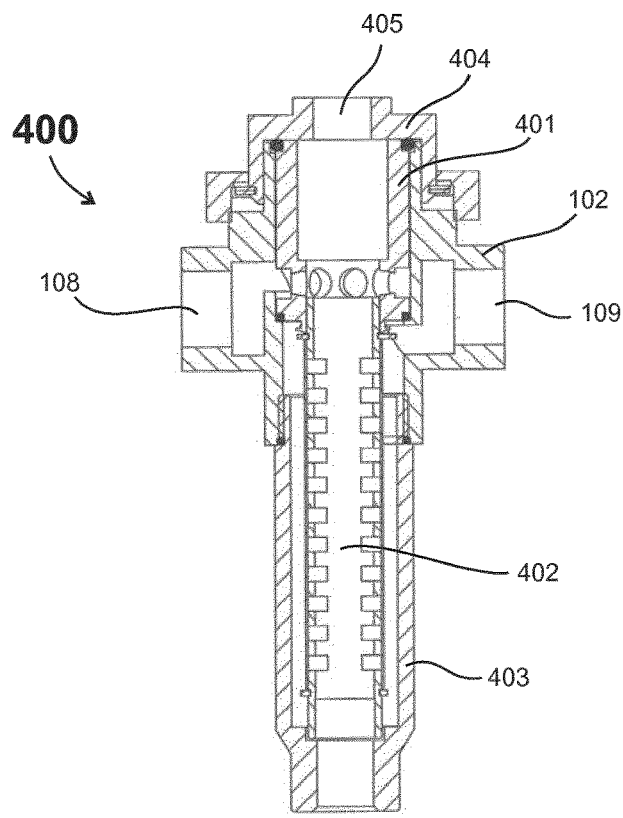

FIG. 20 a modular filter 400 comprising the device body 102 and a filtering insert 401 with a filter cartridge 402 mounted along the primary axis of the device body 102. The filter intercepts the flow from the inlet opening 108 to the outlet opening 109 so as to force the fluid flow to pass through the filter cartridge 402. The filter cartridge 402 is enclosed by a filter hat 403, and the filter insert 401 is covered by a lid 404, which may comprise a measurement port 405 for connecting a measurement instrument, such as a pressure indicator.

While the above disclosed embodiments of modular auxiliary devices synergistically enhance the modularity and simplify the configuration of a pilot operated hydraulic control system for complex control functions, the advantages of these auxiliary devices may also be achieved in other contexts. For example, the particularly compact configuration of a dual seat multiple-function valve block 301, fitted with regulating modules, may itself be advantageous as a control valve for numerous applications requiring complex combinations of multiple control functions.

REFERENCE NUMBERS 1 hydraulic control valve assembly
2 control valve
3 valve body
4 inlet
5 high pressure side
6 outlet
7 low pressure side
8 valve bonnet
9 distribution block
10 control chamber
11, 12 taps
13 valve member (disk)
14 diaphragm
15 valve stem
16 stem guide
17 diaphragm clamp
18 spring
19 valve seat
20 housing
21 top wall
22 bottom wall
23 circumferential wall
24 insert
25 common plenum
26 aperture
27 control input
28 control output
29 flange
30 flange
31/32 feed/bleed port
33/34 feed/bleed channel
35/36 feed/bleed constriction
37/38 feed/bleed channel opening
39/40 feed/bleed needle valve
41/42 feed/bleed check valve
43 orifice
44 input/output axis
45 feed/bleed adjustment axis
46 input conduit
47 output conduit
48 control pilot
100, 200, 300 pilot valve
101, 201, 301 valve block
102 device body
103 valve trim insert
104 stem guide
105 valve stem
106 valve member
107 valve seat
108/109 inlet/outlet opening
110 inner chamber
111 mechanical bias
112/113 first/second opening
114 plug
115 inlet chamber
116 openings
117 outlet chamber
118 valve passage
119 standardised interface
120 standardised interface flange
121, 221, 321 regulating module
124 diaphragm
125 proximal chamber
126 distal chamber
127, 227, 327 proximal chamber inlet
128, 228, 328 distal chamber inlet
129 mechanical bias
130 stud
131, 133, 134, 136, 237, 238, 243, 246, 337, 338, 351 hydraulic pressure signals
132 flow constriction
135 vessel
204, 304 intermediate piece
205, 305 valve stem
206 upper portion of valve stem
221 regulating module
239, 339 three-way solenoid valve
240 timer
241 controller
242 flow transmitter
244 three-way hydraulic relay
245 main control valve
247 probe for flow velocity dependent pressure signal (e.g. Annubar)
306 valve member
307 valve seat
318 valve passage
350 spring
352 three-way valve
400 filter module
401 filter insert
402 filter cartridge
403 filter hat
404 lid
405 measurement port

The invention claimed is:

1. A hydraulic control valve assembly for use in a pilot-operated hydraulic control system, the hydraulic control valve assembly comprising:
 a control valve including:
  (a) a valve body defining a main flow passage from an inlet on a high pressure side of the control valve to an outlet on a low pressure side of the control valve;
  (b) a valve member arranged in the main flow passage and separating the high pressure side from the low pressure side;

(c) a control chamber configured to hydraulically actuate the valve member by applying a control pressure to the control chamber so as to control a positioning of the valve member between an open position and a closed position thereby adjusting a flow through the main flow passage in response to the control pressure;

(d) a feed port configured to feed fluid to the control chamber to increase the control pressure therein;

(e) a bleed port configured to bleed fluid from the control chamber to decrease the control pressure therein; and (f) a valve bonnet closing the control chamber, a feed check valve determining a feed flow direction;

a bleed check valve determining a bleed flow direction;

a distribution block including a common plenum;

a control input in fluid communication with the common plenum; and a control output in fluid communication with the common plenum, wherein the distribution block further comprises:

(a) a feed channel connecting the common plenum with the feed port via an adjustable feed constriction; and (b) a bleed channel connecting the common plenum with the bleed port via an adjustable bleed constriction.

2. The hydraulic control valve assembly of claim 1, wherein the control input comprises an input orifice.

3. The hydraulic control valve assembly of claim 1, wherein at least one of the adjustable feed constriction and the adjustable bleed constriction is a needle valve.

4. The hydraulic control valve assembly of claim 1, wherein the distribution block has a housing at least partially defining the common plenum, wherein the housing has a top wall, a bottom wall opposite to the top wall as seen in an axial direction, and a circumferential wall connecting the top wall and the bottom wall.

5. The hydraulic control valve assembly of claim 4, wherein the bottom wall of the housing includes a flange portion for connecting the distribution block to a cooperating flange portion on the control valve, the cooperating flange portion comprising at least one of the feed port and the bleed port.

6. The hydraulic control valve assembly of claim 5, wherein said cooperating flange portion of the control valve is arranged on the valve bonnet.

7. The hydraulic control valve assembly of claim 5, wherein the feed channel extends from the common plenum via the adjustable feed constriction to a feed opening provided in the flange portion, the feed opening being aligned for operative connection with the feed port when the distribution block is connected to the control valve, and wherein the bleed channel extends from the common plenum via the adjustable bleed constriction to a bleed opening provided in the flange portion, the bleed opening being aligned for operative connection with the bleed port when the distribution block is connected to the control valve.

8. The hydraulic control valve assembly of claim 4, wherein the housing has a central bore parallel to the axial direction, wherein the central bore is closed by an insert, and wherein the insert defines the common plenum in combination with the housing.

9. The hydraulic control valve assembly of claim 1, wherein at least one of the feed check valve and the bleed check valve is a biased check valve.

10. The hydraulic control valve assembly of claim 1, wherein the feed of the feed port controls closing of the control valve, and the bleed of the bleed port controls opening of the control valve.

11. The hydraulic control valve assembly of claim 1, wherein at least one of the feed port of the control chamber and the bleed port of the control chamber is integrated in the valve bonnet.

12. The hydraulic control valve assembly of claim 1, wherein:

(a) the feed check valve is integrated in the feed port of the control chamber;

(b) the bleed check valve is integrated in the bleed port of the control chamber;

(c) the feed check valve is integrated in the distribution block in a portion of the feed channel between the adjustable feed constriction and the feed port; and (d) the bleed check valve is integrated in the distribution block in a portion of the bleed channel between the adjustable bleed constriction and the bleed port.

13. A pilot-operated hydraulic control system comprising the hydraulic control valve assembly of claim 1, the hydraulic control system further comprising an input conduit connecting the high pressure side of the control valve with the control input, an output conduit connecting the control output with the low pressure side of the control valve, and a control pilot arranged in at least one of the output conduit and the input conduit.

14. The hydraulic control valve assembly of claim 1, wherein the distribution block comprises an internal portion that defines at least part of the bleed channel.

15. The hydraulic control valve assembly of claim 1, wherein the distribution block at least partially houses the bleed channel.

* * * * *